United States Patent [19]

Hitomi et al.

[11] Patent Number: 5,133,310
[45] Date of Patent: Jul. 28, 1992

[54] INTAKE AND EXHAUST CONTROL APPARATUS FOR INTERNAL COMBUSTION ENGINES

[75] Inventors: Mitsuo Hitomi; Junsou Sasaki, both of Hiroshima, Japan

[73] Assignee: Mazda Motor Corporation, Hiroshima, Japan

[21] Appl. No.: 628,905

[22] Filed: Dec. 18, 1990

[30] Foreign Application Priority Data

Dec. 18, 1989 [JP] Japan .................. 1-327763

[51] Int. Cl.⁵ .................................................. F01L 1/34
[52] U.S. Cl. .............................. 123/90.15; 123/90.16; 123/90.31
[58] Field of Search .............. 123/90.17, 90.15, 90.31, 123/90.16, 90.18, 90.11, 90.24

[56] References Cited

U.S. PATENT DOCUMENTS

| | | | |
|---|---|---|---|
| 3,877,222 | 4/1975 | Scherenberg | 123/90.15 |
| 4,350,129 | 9/1982 | Nakajima et al. | 123/90.15 |
| 4,494,496 | 1/1985 | Nakamura et al. | 123/90.15 |
| 4,700,684 | 10/1987 | Pischinger et al. | 123/90.11 |
| 4,716,863 | 1/1988 | Pruzan | 123/90.15 |
| 4,722,315 | 2/1988 | Pickel | 123/90.15 |
| 4,856,465 | 8/1989 | Denz et al. | 123/90.15 |
| 4,860,709 | 8/1989 | Clarke et al. | 123/90.15 |
| 4,917,057 | 4/1990 | Seki | 123/90.16 |
| 4,917,058 | 4/1990 | Nelson et al. | 123/90.17 |
| 4,961,406 | 10/1990 | Burandt | 123/90.15 |
| 4,967,701 | 11/1990 | Isogai et al. | 123/90.11 |
| 4,974,560 | 12/1990 | King | 123/90.17 |
| 4,993,370 | 2/1991 | Hashiyama et al. | 123/90.17 |
| 5,003,939 | 4/1991 | King | 123/90.16 |
| 5,020,487 | 6/1991 | Krüger | 123/90.15 |
| 5,022,357 | 6/1991 | Kawamura | 123/90.15 |
| 5,031,582 | 7/1991 | Krüger | 123/90.15 |

FOREIGN PATENT DOCUMENTS 62-191636  8/1987  Japan.

Primary Examiner—E. Rollins Cross
Assistant Examiner—Thomas N. Moulis
Attorney, Agent, or Firm—Fleit, Jacobson, Cohn, Price, Holman & Stern

[57] ABSTRACT

An intake-exhaust control system includes a mechanism for changing timings at which the open periods of intake and/or exhaust valves overlap. A control unit cooperates with the valve timing changing mechanism to cause it to change the timing stepwise so as to vary the valve overlap in time, or in degrees, in a plurality of steps according to engine operating conditions, such as engine speed and engine load. The valve overlap, when the engine operates under medium or moderate engine speeds, is varied so as to be larger or longer under medium engine loads than under higher or heavier and lower or lighter engine loads.

16 Claims, 5 Drawing Sheets

INTAKE AND EXHAUST CONTROL APPARATUS FOR INTERNAL COMBUSTION ENGINES

The present invention pertains to an intake-exhaust control apparatus for an internal combustion engine and, more particularly, to an intake-exhaust control system in which a valve overlap period is controlled properly, according to engine operating conditions, to improve fuel efficiency and to provide well controlled emission while ensuring stable fuel combustion.

BACKGROUND OF THE INVENTION

Typically, in order for an internal combustion engine to aspirate intake air into a cylinder in its intake cycle and to exhaust or discharge combustion gases out of the cylinder in its exhaust cycle, the intake and exhaust valves are timed to be open simultaneously during an overlap period. It is well known in the art that the valve overlap period affects the intake and exhaust performance of the engine and, therefore, the performance of the engine.

In order for the internal combustion engine to have stable fuel combustion, it is necessary for the valve overlap period to be short in time, or small in degrees, during idling. In other words, because, during idling, the amount of fuel mixture supplied is small, the stability of fuel combustion is relatively poor, and a boost negative pressure is high, combustion gases are easily aspirated into, and retained so that they reside in, the combustion chamber of the cylinder. For this reason, if the valve overlap is long in time, or large in degrees, the stability of fuel combustion is considerably worsened.

On the other hand, it has been thought that under higher or heavier engine loads, engine output torque can be raised by setting the valve overlap so that it is long or large. This is because a long or large valve overlap develops a high charging efficiency with inertia effects in intake air.

Recently, as is described in, for instance, Japanese Unexamined Patent Publication No. 62 - 191636, it has been proposed to install a valve timing changing mechanism for intake valves, exhaust valves, or both in an internal combustion engine. The valve timing changing mechanism changes valve timings so as to shorten or reduce the valve overlap during idling and to prolong or increase it while the engine operates under engine operating conditions other than engine idling. The valve timing changing mechanism described in the above publication sets the valve overlap so that it is generally longer or larger under higher or heavier engine loads in a low and a high speed range, but shorter or smaller in a specific high speed range in order to improve engine output torque.

The effects of valve overlap have been thoroughly considered in an attempt to ensure the idling stability of the engine and to improve the charging efficiency of intake air and the output torque of the engine. However, no sufficient consideration has been made in connection with the effects of valve overlap on engine performance, and there has not been any attempt to vary the valve overlap period in accordance with engine operating conditions, such as, in particular, engine speed and engine load, in order for the engine to reduce harmful emissions containing oxides of nitrogen (NOx) and hydrocarbon (HC) and to improve fuel economy.

Considering the effect of valve overlap on engine performance, it is desirable for the valve overlap of the intake and exhaust valves to increase so that it is longer in time, or larger in degrees, as the engine speed, usually in rpm, increases, in order to increase the output torque of the engine for full-throttle engine operating conditions.

In connection with oxides of nitrogen (NOx), however, the residual gases (including a reflux of exhaust gas from the exhaust system) in the combustion chamber will increase with an increase in valve overlap. This is due to what is known as "internal exhaust gas recirculation" or internal EGR. This internal exhaust gas recirculation, or internal EGR, is significant, particularly when the negative boost pressure is high while the engine operates at lower or lighter engine loads. The internal exhaust gas recirculation (internal EGR) causes a drop in fuel combustion stability and a reduction in the content of oxides of nitrogen (NOx) of exhaust gases.

Regarding hydrocarbon (HC), when an engine load does not change, the hydrocarbon (HC) content of exhaust gas decreases with a reduction in valve overlap for lower engine speeds and with an increase in valve overlap for higher engine speeds. Further, when engine speed does not change, .the hydrocarbon (HC) content of exhaust gas decreases with a reduction in valve overlap for lower engine loads and with an increase in valve overlap for higher engine loads. As far as the hydrocarbon (HC) content of exhaust gas is concerned, it is preferable to increase the valve overlap with an increase in engine speed or with an increase in engine load.

Pumping loss for intake air also decreases with an increase in residual gas in the combustion chamber, and fuel efficiency is improved with a decrease in the hydrocarbon (HC) content of exhaust gas. External exhaust gas recirculation (EGR), which is utilized to reduce the content of oxides of nitrogen (NOx) of exhaust gas, does not always cause a reflux of unburned gas, which is produced when the fuel adheres to the cylinder wall during a later stage of an exhaust cycle and is high in concentration, into the combustion chamber. Therefore, no reduction in hydrocarbon (HC) content is induced. Furthermore, since the temperature of recirculating exhaust gas is low, the pumping loss does not sufficiently decrease.

Increasing the valve overlap period or angle under lower or lighter engine loads is undesirable with respect to the stability of fuel combustion and idling stability. Further, increasing the valve overlap period or angle under higher or heavier engine loads is, although desirable for oxides of nitrogen (NOx) and hydrocarbon (HC) in order to reduce its content, undesirable with respect to the output torque of engine. This is because when increasing the valve overlap under higher or heavier engine loads, the pressure of exhaust gas becomes higher, resulting in making it difficult to easily aspirate or charge fresh air and, accordingly, lowering the efficiency of charging fresh air, so that the output torque of the engine is dropped adversely.

The valve timing changing mechanism described in the above mentioned publication, as was previously described, can increasingly change a valve operation timing to vary the valve overlap, so that it is long in time or large in degrees under higher or heavier engine loads in a medium range of engine speeds. The mechanism also can decreasingly change the timing to vary the valve overlap so that it is short or small under medium engine loads. Although desirable to reduce the content of oxides of nitrogen (NOx) and hydrocarbon (HC), changing the valve overlap time in such a way is disadvantageous in many aspects. For example, changing the valve overlap in this way fails to acceptably increase the charging efficiency of fresh air under higher or heavier engine loads, lower the content of oxides of nitrogen (NOx) and hydrocarbon (HC) of exhaust gasses under medium engine loads by external exhaust gas recirculation, or improve fuel economy.

The valve timing changing mechanism described above also decreasingly changes the valve overlap in order to increase the output torque of the engine under higher engine speeds. This also makes it difficult to lower the content of oxides of nitrogen (NOx) and hydrocarbon (HC) of exhaust gasses and acceptably improve fuel economy.

SUMMARY OF THE INVENTION

A primary object of the present invention is to provide an intake and exhaust system for an internal combustion engine in which the valve overlap of the engine is controlled so as to change according to engine operating conditions, thereby ensuring stable fuel combustion and a reduction in the contents of oxides of nitrogen (NOx) and hydrocarbon (HC) in exhaust gasses.

This object is achieved by providing an intake and exhaust control system for changing a valve overlap of an internal combustion engine with intake and exhaust valves, at least one of which is changed in operation timing, either linearly or stepwise, by built-in timing means. Monitoring means is incorporated to monitor or detect ongoing operating conditions, such as an ongoing engine speed and an ongoing engine load, and to provide appropriate signals representative of the ongoing engine speed and engine load. In response to these signals, control means causes the timing means to change the operation timing, either linearly or stepwise so as to vary the valve overlap in time, or in degrees, in a plurality of steps.

Specifically, the valve overlap, for medium or moderate engine speeds, is varied so as to be larger in degrees under medium engine loads than under higher or heavier and lower or lighter engine loads. When the engine operates at a load falling in a medium engine load range, a relatively large amount of fresh fuel air is aspirated in a combustion chamber of the cylinder of the engine and a negative boost pressure is lowered. Accordingly, the stability of fuel combustion is not adversely affected, even if the valve overlap is large. Moreover, the internal exhaust gas recirculation (internal EGR) lowers fuel combustion efficiency due to a large amount of residual exhaust gas in the combustion chamber, resulting in a decrease in generation of oxides of nitrogen (NOx). Additionally, a decrease in hydrocarbon (HC) content of exhaust gas is caused, due to the burning of residual fuel gas retained unburned in the combustion chamber in a later stage of the exhaust cycle, resulting in lowering the hydrocarbon (HC) content of the exhaust gas and producing residual exhaust gas pressure which decreases intake pumping loss. An improvement in fuel efficiency is, therefore, provided.

Because the valve overlap is not set so as to be large under lower engine loads, fuel combustion stability is not adversely affected. Also, because the valve overlap is set so as to be small under higher engine loads, intake air is charged with a high efficiency, in spite of a high exhaust gas pressure under higher engine loads, so as not to cause a decrease in engine output torque.

Increasingly varying the valve overlap so that it is larger as engine speeds increase suppresses the combustion of fuel with internal exhaust gas recirculation (internal EGR). This results in a decrease in the content of oxides of nitrogen (NOx) of exhaust gas, which is generally increased with an increase of engine speed, and retaining and burning a large amount of residual exhaust gas, which is high in concentration, in the combustion chamber in a later stage of the exhaust cycle, so as to lower the hydrocarbon (HC) content of the exhaust gas and the intake pumping loss and improve the output torque of engine and fuel economy.

BRIEF DESCRIPTION OF THE DRAWINGS

The above and other objects and features of the present invention will be apparent from the following description of preferred embodiments thereof when considered with the appended drawings, in which similar reference numbers have been used to designate the same or similar elements throughout the drawings, and in which.

DETAILED DESCRIPTION OF THE PREFERRED EMBODIMENTS

Figure 1:
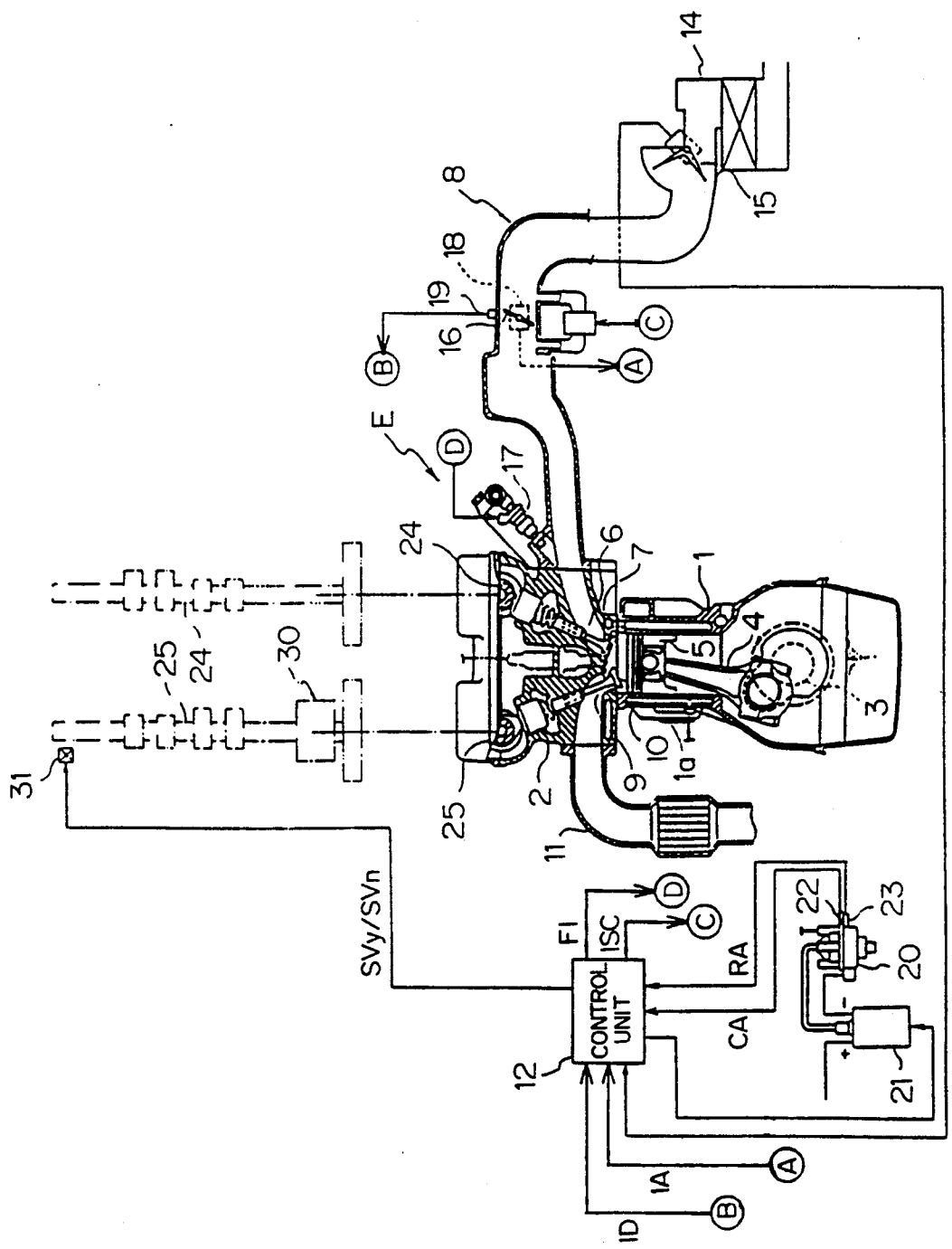
FIG. 1 is a schematic cross-sectional view of an internal combustion engine with an intake and exhaust control system in accordance with a preferred embodiment of the present invention.

Referring to the drawings in detail, and in particular to FIG. 1, an in-line, four cylinder, internal combustion engine, equipped with an intake-exhaust control system according to a preferred embodiment of the present invention is shown. The engine E comprises a cylinder block 1 provided with four cylinders 1a arranged in a straight line (only one of which is shown) in which pistons 5 can slide, and a cylinder head 2, mounted on the cylinder block 1. The pistons 5 are connected to a crankshaft 3 by a connecting rod 4. A cylinder head cover 2a is provided to cover the upper portion of the cylinder head 2. Each cylinder 1a is provided with an intake port 6 and an exhaust port 9 with openings which extend to opposite sides of the cylinder block 1. The intake and exhaust ports 6 and 9 open into the combustion chamber of the cylinder 1a, and are opened and shut at a predetermined timing by intake and exhaust valves 7 and 10, respectively. The engine E itself and its associated elements, including the above elements 3-7, 9 and 10, are conventional and well known in structure and operation to those skilled in the art. A more detailed description is, therefore, unnecessary.

Engine E is attached with an intake passage or duct 8, communicating with the intake port 6 and with an exhaust passage or duct 11 communicating with the exhaust port 11. Intake passage 8 is provided, in order from its upstream end, with an air cleaner 14, an airflow meter 15, a throttle valve 16 and a fuel injector 17, all of which are well known in structure and operation to those skilled in the art.

Distributor 20, having an axle of rotation (not shown) which is connected, by any conventional mechanical linkage or mechanism, to the crank shaft 3, is electrically connected with an ignition unit 21. Distributor 20 has a crank angle sensor 22 which detects or senses the speed of rotation, or operated angular positions, of the distributor axle to indicate the speed of rotation of the crank shaft 3, and a reference crank angle sensor 23.

Engine E is further equipped with an intake camshaft 24 and an exhaust camshaft 25. The intake camshaft 24, which is formed with one cam for each intake valve 7, is rotatably mounted on the cylinder head 2 so as to drive, or open and close, the respective intake valve 7. The exhaust camshaft 25, which is formed with one cam for each exhaust valve 10, is rotatably mounted on the cylinder head 2 so as to drive, or open and close, each respective exhaust valve 10. These intake and exhaust camshafts 24 and 25, mounted in juxtaposition above the crankshaft 3 in the upper portion of the cylinder head 2, are rotationally connected to each other by intake and exhaust camshaft gears 28 and 27 (see FIG. 2), having ends thereof, respectively, in mesh with each other. A camshaft pulley or sprocket 26 (see FIG. 2) is coaxially mounted on and secured to one end of the exhaust camshaft 25 and is connected by any conventional timing belt or drive belt to a drive pulley or sprocket (not shown but well known in the art) coaxially secured to the crankshaft 3, so as to operationally or rotatably couple the exhaust camshaft 25 to the crankshaft 3.

Exhaust camshaft 25 cooperates with a valve timing changing mechanism 30, located around the front end of the exhaust camshaft 25, to change an operation timing, such as a closing timing, of the exhaust valve 10 and vary what is referred to as a "valve overlap," defined in time or in degrees, during which both intake and exhaust valves are open. The valve overlap varies between a long or large overlap and a short or small overlap.

Figure 2:
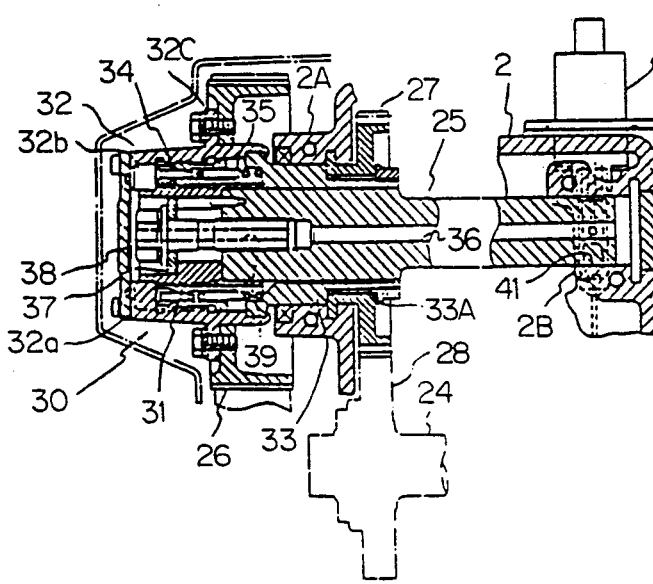
FIG. 2 is a cross-sectional view of a valve timing changing mechanism.
Figure 3:
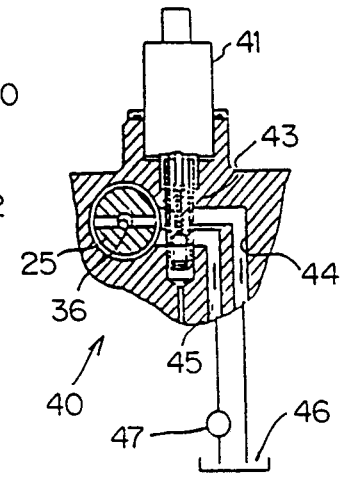
FIG. 3 shows a cross-sectional view of an actuator for the valve timing changing mechanism shown in FIG. 2.

Referring to FIGS. 2 and 3, showing a general construction of the valve timing changing mechanism 30, a spacer sleeve 31, formed with axially separated front and rear internal shoulders, is coaxially fitted onto the exhaust camshaft 25 with its rear inner shoulder abutted against the front end surface of exhaust camshaft 25. This spacer sleeve 31 is firmly secured by a fastening or retainer bolt 38 to the exhaust camshaft 25 through a stopper ring 37 seated on the front internal shoulder of the spacer sleeve 31. A cylindrical connecting sleeve 32, formed with axially separated internal and external flanges 32a and 32c, is coaxially, rotatably mounted on the spacer sleeve 31 with the inner surface of its internal flange 32a in contact with the outer surface of the spacer sleeve 31 and is coupled with the exhaust camshaft sprocket 26 bolted, or otherwise secured, to the external flange 32c of the connecting sleeve 32. The connecting sleeve 32 accommodates therein a hollow annular piston 34, which will be described later, behind the internal flange 32a.

An interconnecting sleeve or ring 33, coaxially and rotatably mounted on the exhaust camshaft 25, is firmly secured to the rear end of the connecting sleeve 32 in any well known manner and is rotatably supported in a front bearing structure 2A of the cylinder head 2. This interconnecting ring 33 is formed with a stepped rear end portion 33a having a spline. The exhaust camshaft gear 27 is mounted on the stepped rear end 33a in splined engagement.

Hollow annular piston 34, disposed between the spacer 31 and connecting sleeve 32, is structurally divided into two piston segments in an axial direction which are fixedly connected by conventional mechanical connectors, such as set screws or fixing pins, to each other. The hollow annular piston 34 has helical splines, directed in opposite directions, formed on its inner and outer surfaces. These inner and outer helical splines are in mesh with a helical spline formed on the outer surface of the spacer sleeve 31 and a helical spline formed on the inner surface of the connecting sleeve 32, respectively. The connecting sleeve 32 further accommodates therein a coil spring 35 to urge the hollow annular piston 35 against the front flange 32a of the connecting sleeve 32.

A fluid channel or passage 36, in the form of an axial bore, is formed throughout the exhaust camshaft 25, which is communicated by an axial bore 39 extending throughout the retainer bolt 38 with a pressure chamber 32b formed in the front flange 32a of the connecting sleeve 32. Through this fluid passage 36, a hydraulic fluid, such as oil, is introduced into the pressure chamber 32b from a hydraulic system having a hydraulic pump, such as a lubrication oil pump, well known in the automobile art. The exhaust camshaft 25 is further held, at its other, or rear, end by a rear bearing structure 2B of the cylinder head 2, for rotation. A bearing bore 41 of the bearing structure 2B is plugged by a plug 42.

Valve timing changing mechanism 30 includes hydraulic oil control means or system 40 for forcing oil to be supplied into the fluid passage 36, shutting off the oil supply, and draining the oil out of the fluid passage 36. As is shown in FIGS. 2 and 3, the hydraulic oil control system 40 includes a directional control or selector valve 43, installed in the rear bearing structure 2B of the cylinder head 2 near the rear end of the exhaust camshaft 25. The selector valve 43 is actuated or operated by an actuator, such as an ON-OFF solenoid 41, mounted on the rear bearing structure 2B of the cylinder head 2, to change the valve closing timing of the exhaust valve 10 so as to delay or retard the closing of the exhaust valve so that it closes later than usual, thereby making the valve overlap longer. The solenoid 41, when energized or turned ON for making the valve overlap longer, shifts the selector valve 43 up to open a feed passage 45 in communication with an oil gallery 46 so as to allow oil, pumped from the oil gallery 46 by a hydraulic pump 47, driven by the crankshaft 3, to enter the oil passage 36. When the solenoid 41 is deenergized or turned OFF to make the valve overlap shorter than usual, it shifts the selector valve 43 down to close or shut down the feed passage 45 and open a drain passage 44 in communication with the oil gallery 46 so as to discharge or drain part of the oil out of the oil passage 36.

When energizing the solenoid 41 to shift the selector valve 43 up, oil is fed into the pressure chamber 32b in the front flange 32a of the connecting sleeve 32 through the fluid passage 36 of the exhaust camshaft 25 and the axial bore 39 of the retainer bolt 38, so as to force and compress the spring 35 rearward. As a result, the piston 34 is displaced rearward in an axial direction of the exhaust camshaft 25, so as to cause a relative turn or angular displacement between the spacer sleeve 31 and the exhaust camshaft pulley 26 via the oppositely directed inner and outer splines of the piston 34. As a result, therefore, a shift in relative phase between the exhaust camshaft 25 and the exhaust camshaft pulley 26 structurally integral with the spacer sleeve 31 and the connecting sleeve 32, respectively, is caused.

Figure 4:
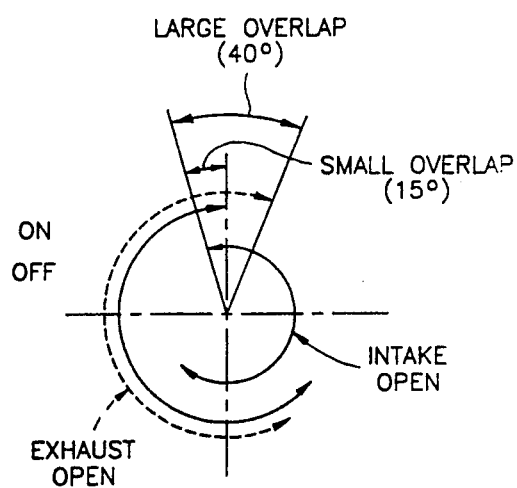
FIG. 4 is a valve timing diagram.

Referring to FIG. 4, when feeding the oil into the pressure chamber 32b to cause a predetermined change of relative angular position in one rotational direction between the exhaust camshaft 25 and the exhaust camshaft pulley 26, the opening of only the exhaust valve 10 is delayed or retarded, so as to enlarge the valve overlap in degrees to, for instance, 40 degrees. Conversely, when the oil is partly drained out of the pressure chamber 40, the piston 34 returns to its original position, shown in FIG. 2, under the force of spring 35, so as to cause the same predetermined change of relative angular position, but in the opposite rotational direction, between the exhaust camshaft 25 and the exhaust camshaft pulley 26. Then, the exhaust valve 10 is advanced so as to open and vary the valve overlap so that it is as small as usual. The usual valve overlap may be for instance, 15 degrees.

Engine E is controlled by a control unit 12 via input signals from such elements as the airflow meter 15, throttle sensor 18, idle switch 19, crank angle sensor 22 and reference crank angle sensor 23. As is well known in the art, the airflow meter 15 gives an indication of the amount of intake air and sends an appropriate signal (IF) to the control unit 12. The throttle sensor 18 cooperates with the throttle valve 16 to give an indication of the operated or angular position of the throttle valve 16 and to send an appropriate signal (TH) to the control unit 12. The idle switch 19 cooperates with the throttle valve 16 to give an indication of when the throttle valve 16 is in its idle position and to send an appropriate signal (ID) to the control unit 12. The crank angle sensor 22 cooperates with the distributor 20 to give, as the speed of rotation of the crank shaft 3, an indication of the speed of rotation of the distributor axle and to send an appropriate signal (CA) to the control unit 12. The reference crank angle sensor 23 additionally sends a predetermined cycle of angular signals (RA) to the control unit. The control unit 12, when receiving these signals, provides, in response thereto, control signals, in accordance with the engine operating conditions, to the fuel injector 17, ignition unit 21 and solenoid 41 to operate the fuel injector, ignition unit and solenoid.

Control unit 12 may comprise a general purpose microcomputer made up of an input-output interface, a central processing unit (CPU), a read only memory (ROM), a random access memory (RAM), A/D converters for converting analog signals from the airflow meter 15 and throttle opening sensor 18 to digital signals, and driving circuitry (DC) for driving the injector 17, the ignition unit 21, and the solenoid 31.

The ROM stores various programs and information, such as an ignition timing control program, including a map of basic ignition timing advancing angles, a fuel injection control program, including a map of basic fuel amounts for engine operating conditions for calculating a required amount of fuel to be injected and driving the injector 17 to inject the calculated amount of fuel, a selector valve operation timing control program for controlling the selector valve 43 to vary the valve overlap, in degrees, of the intake and exhaust valves via the solenoid 41, and other necessary control programs for operating the engine E, such as an idle speed control program, etc.

Figure 9:
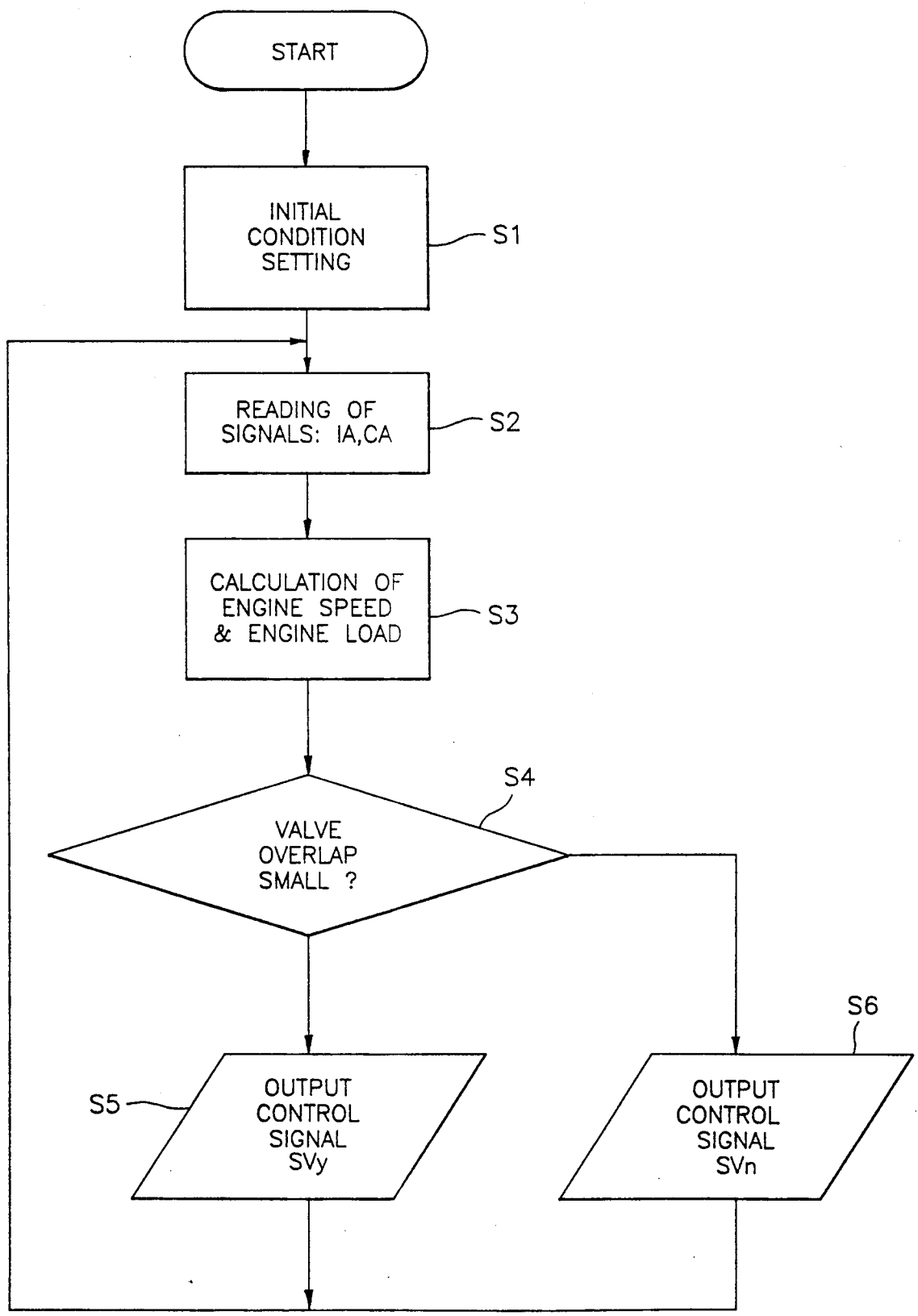
FIG. 9 is a flow chart illustrating a valve timing changing routine.

The operation of the valve timing changing mechanism 30 shown in FIGS. 2 and 3 is best understood by reviewing a flow chart shown in FIG. 9, illustrating a valve timing control routine for the microcomputer of the control unit 12. Programming a computer is a skill well understood in the art. The following description is written to enable a programmer having ordinary skill in the art to prepare an appropriate program for the microcomputer of the control unit 12. The particular details of any such program would, of course, depend upon the architecture of the particular computer selected.

Referring to FIG. 9, which illustrates a flow chart of the valve timing changing control routine, when, after starting the engine E, valve timing changing control is initiated, the microcomputer is set to its initial conditions at step S1. The microcomputer then reads, at step S2, an airflow signal (IA), representative of the amount of incoming intake air, from the airflow meter 15, and a crank angle signal (CA), representative of an operated angular position of the crankshaft 3, from the crank angle sensor 22. At step 3, an ongoing engine speed, in rpm, is calculated, based on the crank angle signal (CA) received and further, an ongoing engine load is calculated, based on both the calculated engine speed and the detected amount of incoming intake air. Thereafter, a first decision is made at step S4 as to whether the ongoing engine operating condition is in a zone where the valve overlap is to be set small.

Figure 5:
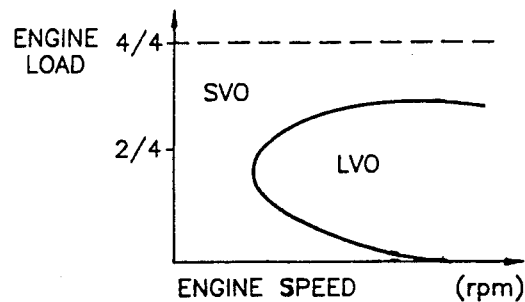
FIG. 5 is a diagram showing two, i.e. higher and lower, zones of engine operating conditions, for which different valve overlaps are preset.

Referring to FIG. 5, which shows a map of two engine operating zones for large valve overlap (LVO) and small valve overlap (SVO), respectively, it can be seen that the map is defined by two parameters, engine speed and engine load. The map data is stored in the ROM and read out to make the decision at step S4.

If the answer to the decision at step S4 is "yes," this indicates that a condition under which the engine E is operating falls in the zone appropriate for small valve overlap. The control unit 12 then outputs or provides the solenoid 31 with a control signal SVy, to deenergize or turn OFF the solenoid 31, at step S5. Consequently, the selector valve 43 is shifted down to drain the oil out of the oil passage 36 so as to turn the exhaust camshaft 25 and the exhaust camshaft pulley 26 in a direction which decreases the difference in angular phase therebetween. This causes closing of the exhaust valve 10 to advance and results in setting the valve overlap between the intake and exhaust valves 7 and 10 at the small value of about 15 degrees. On the other hand, if the answer to the decision in step S4 is "no," this indicates that a condition under which the engine E is operating falls in a zone appropriate for large valve overlap. The control unit 12 then outputs or provides the solenoid 31 with a control signal SVn to energize or turn ON the solenoid 31 at step S6, so as to shift the selector valve 43 up to apply the oil into the oil passage 36, thereby turning the exhaust camshaft 25 and the exhaust camshaft pulley 26 in a direction which increases the difference in angular phase therebetween. Accordingly, closing of the exhaust valve 10 is delayed or retarded, so that the valve overlap between the intake and exhaust valves 7 and 10 is varied to the larger value of about 40 degrees.

After each operation at step S5 or S6, the routine returns to step S2 to make another decision at step S4. Thus the decision is made on a controlled cycle, which is very short.

Figure 6:
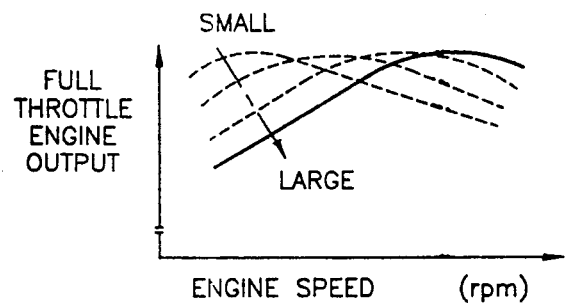
FIG. 6 is a diagram showing full-throttle engine torque.
Figure 7:
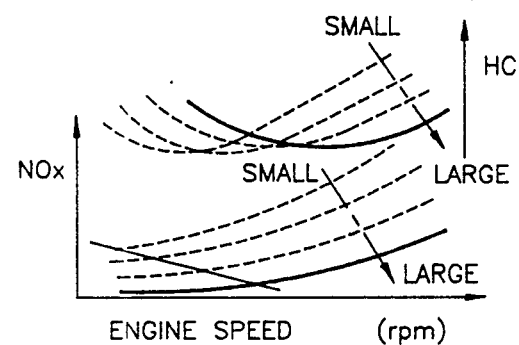
FIG. 7 is a diagram showing the contents of oxides of nitrogen (NOx) and hydrocarbon (HC) for a constant engine load.
Figure 8:
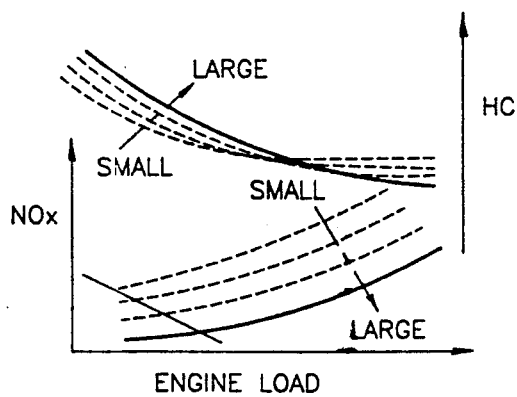
FIG. 8 is a diagram showing the contents of oxides of nitrogen (NOx) and hydrocarbon (HC) for a constant engine speed.

Referring to FIGS. 6-8, showing the effect of varying a valve overlap on engine performance, as valve overlap increases, the amount of residual combustion gas in the combustion chamber increases, and the stability of fuel combustion is controlled or suppressed. Accordingly, the content of oxides of nitrogen (NOx) of exhaust gas goes down as the valve overlap increases independently from ongoing engine speeds. Additionally, with regard to full-throttle engine torque, the content of hydrocarbon (HC) of exhaust gas, and fuel economy, it is desirable to vary valve overlap so that it becomes larger with an increase in engine speed or with an increase in engine load. The stability of fuel combustion under low engine speeds and/or low engine loads, however, rises with an increase in valve overlap. This is because under such lower engine speeds and/or lower engine loads, only a small amount of fresh air is aspirated and a rising negative boost pressure causes an increase in reflux of exhaust gas.

As is apparent from FIG. 5, since valve overlap between the intake and exhaust valves of the engine equipped with the intake and exhaust control system, according to the present invention, is set small for any engine load in a range of low engine speeds, a high stability of fuel combustion, as well as good idling stability, is ensured.

In a range of moderate or medium engine speeds, the valve overlap is set small for lower or lighter engine loads in order to ensure a high stability of fuel combustion, and is set large for moderate or medium engine loads in order to obtain a sufficient full-throttle engine torque to lower the content of oxides of nitrogen (NOx) and hydrocarbon (HC) of exhaust gas and to improve fuel economy. In particular, when operated under higher or heavier engine loads in the range of moderate or medium engine speeds, the engine E can operate freely from a decrease in output torque. In other words, the engine E, when operated under higher or heavier engine loads, produces a high exhaust gas pressure and, therefore, if the valve overlap is longer than usual, causes a drop in output torque due to a decrease in aspirated fresh air.

In a range of higher engine speeds, valve overlap, because of an assured fuel consumption stability under lower or lighter engine loads, is set large, even for lower or lighter engine loads, in order to obtain a sufficient full-throttle output torque and to lower or reduce the content of oxides of nitrogen (NOx) and hydrocarbon (HC) of exhaust gas. The valve overlap is maintained large for moderate or medium engine loads in order to obtain a sufficient full-throttle output torque and to lower or reduce the content of oxides of nitrogen (NOx) and hydrocarbon (HC) of exhaust gas, but is set small for higher or heavier engine loads in order to prevent a drop in engine output torque.

Although the valve timing changing mechanism 30, in accordance with the above embodiment, cooperates with the exhaust camshaft 25 so as to change a valve operation timing at which the exhaust valve 10 begins to open or closes, the same mechanism as the valve timing changing mechanism 30, or any other conventional valve timing changing mechanism, may be installed to cooperate with the intake camshaft 24 so as to change a valve operation timing at which the intake valve 7 begins to open or closes. For an engine equipped with a supercharger, valve overlap is desirably set slightly smaller for both engine operating zones than for an engine not equipped with a supercharger.

Figure 10:
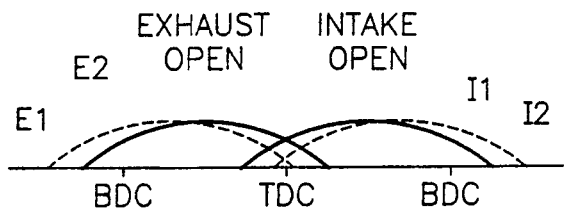
FIG. 10 is an illustration of valve timing.
Figure 11:
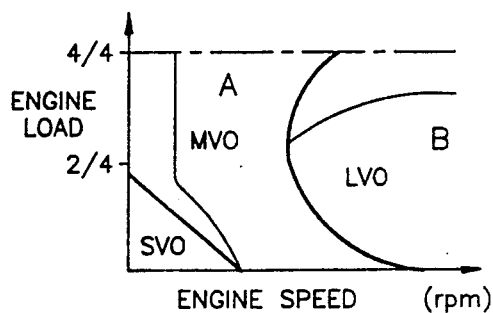
FIG. 11 is a diagram showing three, i.e., higher, medium, and lower, zones of engine operating conditions for which different valve overlaps are preset.

Referring to FIGS. 10 and 11, an intake-exhaust control system in accordance with another preferred embodiment of the present invention is shown, having the same valve timing changing mechanism 30 as described in the previous embodiment, which is installed in and cooperates with each of the exhaust camshaft 25 and the intake camshaft 24. The intake valve 7 and exhaust valve 10 are changeably timed so as to vary valve overlap in three steps so that the overlap is small, medium and large, as shown in FIG. 10. These three steps of valve overlap variation can be obtained by proper combinations of intake cycles I1 and I2 and exhaust cycles E1 and E2. That is, as is apparent from FIG. 10, valve overlap is varied so as to be small with the combination of intake cycle I2 and exhaust cycle E1, medium with the combination of intake cycle I1 and exhaust cycle E1 or with the combination of intake cycle I2 and exhaust cycle E2, and large with the combination of intake cycle I1 and exhaust cycle E2.

Referring to FIG. 11, which shows a map of three engine operating zones, for small valve overlap (SVO), medium valve overlap (MVO), and large valve overlap (LVO), it can be seen that the map is defined by two parameters, engine speed and engine load. The map data is stored in ROM. This map is read out or retrieved from the ROM to determine a proper valve overlap to be set according to engine operating conditions in a sequence substantially similar to the routine shown in FIG. 9. If desired, three engine operating zones may be modified to extend the zones for small and medium valve overlaps as shown by double-dot chain lines A and B in FIG. 11. Extending the zone for small valve overlap ensures stable fuel combustion, and extending the zone for medium valve overlap prevents a drop in engine output torque under high or heavier engine loads.

Solenoids 41 operating the selector valves 43 for the intake camshaft 24 and exhaust camshaft 25, respectively, are controlled so as to be energized or turned ON and OFF in combinations shown in the following table.

| Value overlap | Solenoid for exhaust camshaft | Solenoid for intake camshaft |
|---|---|---|
| Smaller | OFF | ON |
| Medium | ON (or OFF) | ON (or OFF) |
| Higher | ON | OFF |

Varying valve overlap in three steps, small, medium and large, realizes a further improvement in engine performance.

Figure 12:
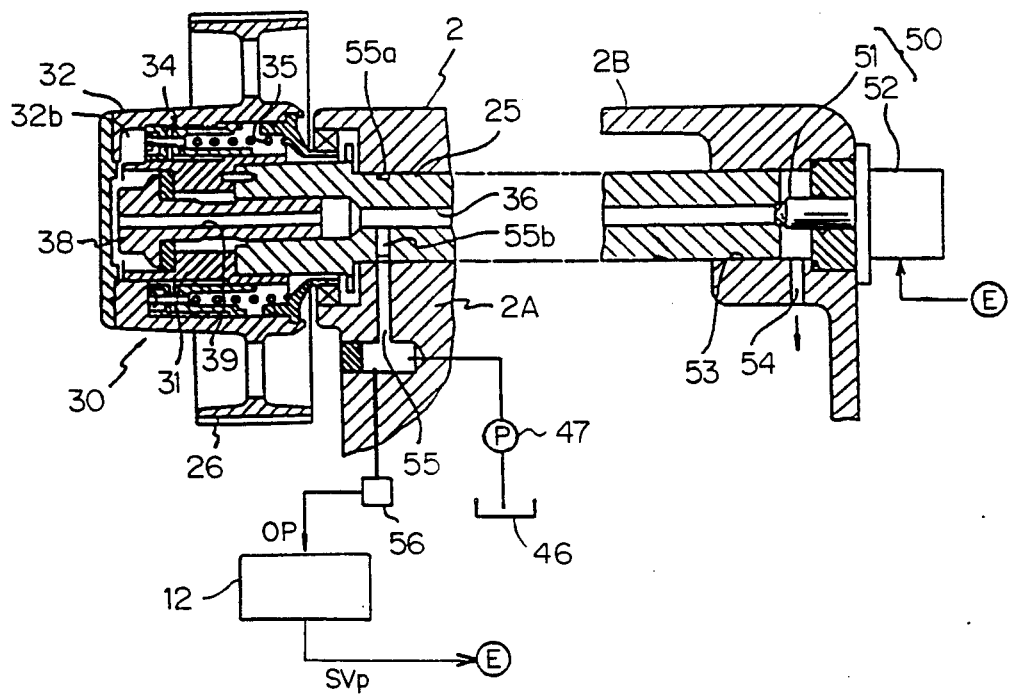
FIG. 12 is a cross-sectional view of a valve timing changing mechanism which is used in combination with an intake and exhaust control system in accordance with another preferred embodiment of the present invention.

Referring to FIG. 12, an intake-exhaust control system in accordance with still another preferred embodiment of the present invention is shown, comprising hydraulic oil control means or system 50 in place of the hydraulic oil control means or system 40 of the previous embodiments. The same valve timing changing mechanism 30 as shown and described in the previous embodiments is employed. However, mechanism 30 changes a relative displacement in angular position between the exhaust camshaft 25 and the exhaust camshaft pulley 26 to larger degree than that of any of the previous embodiments.

Hydraulic oil control means or system 50 includes a relief valve 51, and a linear solenoid 52 as an actuator for the relief valve 51. The relief valve and solenoid are installed in the end of the exhaust camshaft 25, assembled as one unit, and are located at the end of the oil channel or passage 36. When relief valve 51 opens, oil in the oil passage 36 is partly drawn out through a drain passage 54 formed in an end retainer 53, so as to drop pressure in the pressure chamber 32b of the connecting sleeve 32.

Hydraulic oil control means or system 50 further includes a fluid supply chamber 55 with a channel (not indicated) extending toward and leading to a fluid channel or passage 55a. Chamber 55 is formed in the exhaust camshaft bearing 2A of the cylinder head 2, and communicates with the oil gallery 46 through a fluid passage and a hydraulic pump 47, driven by the crankshaft 3. This fluid supply passage 55a is an annular groove, formed in the outer surface of the exhaust camshaft 25, and communicates with the fluid passage 36 by way of a radial bore 55b formed in the exhaust camshaft 25. Thus, the fluid supply chamber 55 is in communication with the pressure chamber 32b of the connecting sleeve 32.

The pressure in the pressure chamber 32b of the connecting sleeve 32 is sensed or detected as a pressure in the fluid supply chamber 55 by a hydraulic pressure sensor 56. The hydraulic pressure sensor 56 gives an indication of the pressure of oil in the pressure supply chamber 55 and sends an appropriate signal (OP) to the control unit 12. The control unit 12, when receiving a pressure signal (OP), as well as signals from various sensors, meters and switches, provides the linear solenoid 52 with a solenoid control pulse (SVp) to operate the relief valve 51 so as to relieve the oil in the fluid passage 36. Accordingly, the pressure in the pressure chamber 32b of the connecting sleeve 32 linearly drops or rises, so that the displacement of the exhaust camshaft pulley 26 relative to the exhaust camshaft 25 is changed linearly. Therefore, the timing of opening of the exhaust valve 10 can be changed steplessly.

Figure 13:
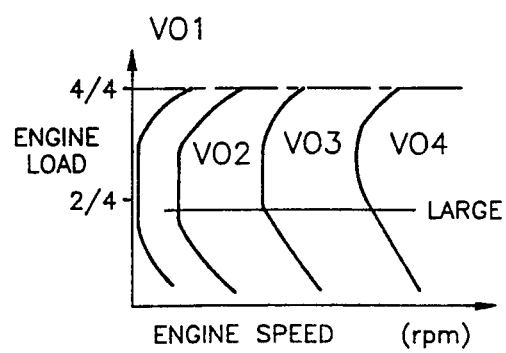
FIG. 13 is a diagram showing a number of zones of engine operating conditions for which different valve overlaps are preset.

FIG. 13 illustrates valve overlap varying lines VO1, VO2, VO3 and VO4. Valve overlap of the intake and exhaust valves 7 and 10 of the engine E is, however, programmed actually to be varied in a plurality of steps as the engine E increases its speed and to be varied, for each specific engine speed, more under medium or moderate engine loads than under lower or lighter and higher or heavier engine loads. These zones and valve overlap varying lines, defined with two parameters, i.e.. engine speed and engine load, are stored as a map in the ROM. This map is read out or retrieved from the ROM to determine a proper valve overlap to be set according to engine operating conditions. The number of valve overlap varying lines may changed, depending upon design considerations.

The pressure in the pressure chamber 32b is controlled by reading a proper valve overlap on the map according to an ongoing engine operating condition and controlling the linear solenoid 52 so as to adjust the intake and exhaust valves to the valve overlap read on the map.

Control unit 12, when receiving a pressure signal as well as signals from various sensors, meters and switches, provides a solenoid control pulse (SVp) in accordance with engine operating conditions to the linear solenoid 52 to operate the relief valve 51 to relieve the oil in the fluid passage 36.

In this embodiment, the engine E, which has a valve overlap which becomes longer with an increase in engine speed, provides a sufficient full-throttle engine torque, a lowered content of oxides of nitrogen (NOx) and hydrocarbon (HC) of exhaust gas and an improved fuel economy for the entire range of engine operating conditions. It is, however, desirable, in order for the engine to prevent a drop in output torque under higher or heavier engine loads to limit the valve overlap to a lower value under these conditions. In order to avoid a drop in pump discharge under low engine speeds, it is preferred to increase a pressure receiving area of the piston 34 or to add an oil pressure accumulator to the hydraulic oil control means or system to back up the oil pressure in the pressure chamber when the oil pressure becomes lower. It is also desirable to use an electrically controlled oil pump to supply a constant oil pressure into the pressure chamber.

What is claimed is:

1. An intake and exhaust control system for changing a valve overlap, in degrees, of an internal combustion engine having intake and exhaust valves, comprising: .
   timing means for changing a valve operation timing of at least one of the intake and exhaust valves of the engine;
   monitoring means for monitoring an engine speed and an engine load and generating signals representative of said engine speed and said engine load; and
   control means responsive to said signals for causing said timing means to change said valve operation timing so as to vary the valve overlap for medium engine speeds so that the valve overlap is larger under medium engine loads than under lower and higher engine loads.

2. An intake and exhaust control system as recited in claim 1, wherein said control means causes said timing means to change said valve operation timing so as to make the valve overlap small independently of engine loads when the engine operates in a range of lower engine speeds.

3. An intake and exhaust control system as recited in claim 2, wherein said control means causes said timing means to change said valve operation timing so as to make the valve overlap smaller under heavier engine loads than under medium and lighter engine loads when the engine operates in a range of higher engine speeds.

4. An intake and exhaust control system as recited in claim 2, wherein said timing means cooperates with the exhaust valve to change the valve operation timing of the exhaust valve.

5. An intake and exhaust control system as recited in claim 4, wherein said timing means advances a valve opening timing of the exhaust valve for making said valve overlap larger.

6. An intake and exhaust control system as recited in claim 2, wherein said timing means cooperates with the intake valve to change the valve operation timing of the intake valve.

7. An intake and exhaust control system as recited in claim 6, wherein said timing means retards a valve closing timing of the intake valve for making said valve overlap larger.

8. An intake and exhaust control system for changing a valve overlap, in degrees, of an internal combustion engine having intake and exhaust valves, comprising:
    timing means for changing a valve operation timing of at least one of the intake and exhaust valves of the engine;
    monitoring means for monitoring engine speeds and engine loads and providing signals representative of engine operating speeds and engine operating loads; and
    control means responsive to said signals for causing said timing means to change said valve operation timing so as to make the valve overlap larger at middle engine operating loads than at high and low engine operating loads for a particular engine speed.

9. An intake and exhaust control system as recited in claim 8, wherein said control means causes said timing means to change the valve overlap stepwise.

10. An intake and exhaust control system as recited in claim 9, wherein said control means causes said timing means to change said valve operation timing linearly with an increase in engine speed so as to vary the valve overlap in a plurality of steps.

11. An intake and exhaust control system as recited in claim 9, wherein said control means causes said timing means to change said valve operation timing in three steps with an increase in engine speed so as to vary the valve overlap in small, medium and large steps.

12. An intake and exhaust control system as recited in claim 11, wherein said timing means cooperates with both the intake and exhaust valves to change said valve operation timings of the intake and exhaust valves.

13. An intake and exhaust control system as recited in claim 12, wherein said timing means retards a valve opening timing of the intake valve, thereby making the valve overlap small.

14. An intake and exhaust control system as recited in claim 12, wherein said timing means retards a valve closing timing of the exhaust valve, thereby making the valve overlap large.

15. An intake and exhaust control system as recited in claim 12, wherein said timing means advances a valve opening timing of the intake valve, thereby making the valve overlap large.

16. An intake and exhaust control system as recited in claim 12, wherein said timing means advances a valve closing timing of the exhaust valve, thereby making the valve overlap small.

* * * * *